(12) United States Patent
Sun et al.

(10) Patent No.: US 10,347,916 B2
(45) Date of Patent: Jul. 9, 2019

(54) GRAPHENE POWDER, METHOD FOR PRODUCING GRAPHENE POWDER AND ELECTRODE FOR LITHIUM ION BATTERY CONTAINING GRAPHENE POWDER

(71) Applicant: TORAY INDUSTRIES, INC., Tokyo (JP)

(72) Inventors: Peiyu Sun, Shanghai (CN); Gangqiao Liu, Shanghai (CN); Zhenqi Wu, Shanghai (CN); Gang Wu, Shanghai (CN); Eiichiro Tamaki, Shiga (JP); Yasuo Kubota, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 617 days.

(21) Appl. No.: 14/406,481

(22) PCT Filed: May 23, 2013

(86) PCT No.: PCT/CN2013/076173
§ 371 (c)(1),
(2) Date: Dec. 8, 2014

(87) PCT Pub. No.: WO2013/181994
PCT Pub. Date: Dec. 12, 2013

(65) Prior Publication Data
US 2015/0140438 A1    May 21, 2015

(30) Foreign Application Priority Data

Jun. 6, 2012  (CN) .......................... 2012 1 0196429

(51) Int. Cl.
*H01M 4/62*       (2006.01)
*H01M 10/0525*    (2010.01)
(Continued)

(52) U.S. Cl.
CPC ............. *H01M 4/625* (2013.01); *B82Y 30/00* (2013.01); *B82Y 40/00* (2013.01); *C01B 32/192* (2017.08);
(Continued)

(58) Field of Classification Search
None
See application file for complete search history.

(56) References Cited

PUBLICATIONS

Xu et al., Macromolecules, 2010, 43, 8336-8339.*
(Continued)

*Primary Examiner* — Barbara L Gilliam
*Assistant Examiner* — Zhongqing Wei
(74) *Attorney, Agent, or Firm* — Pillsbury Winthrop Shaw Pittman LLP

(57) ABSTRACT

In order to prepare a highly conductive and highly dispersible graphene powder and to obtain an electrode for a lithium ion battery with excellent performance utilizing the highly conductive and highly dispersible graphene, a graphene powder and a preparation method thereof is provided. The graphene powder comprises a compound having a catechol group adsorbing on the surface of graphene in a weight ratio of 5-50% relative to the grapheme and the element ratio of oxygen to carbon in the graphene powder measured by X-ray photoelectron spectroscopy is 0.06 or more and 0.20 or less. The method for producing a graphene powder comprise the step of reducing a graphite oxide with a reducing agent having no catechol group in the presence of a compound having a catechol group.

10 Claims, 1 Drawing Sheet

(51) Int. Cl.
    *B82Y 30/00*      (2011.01)
    *B82Y 40/00*      (2011.01)
    *C01B 32/192*     (2017.01)
    *C01B 32/194*     (2017.01)
    *H01M 10/052*     (2010.01)

(52) U.S. Cl.
    CPC ....... *C01B 32/194* (2017.08); *H01M 10/0525* (2013.01); *H01M 10/052* (2013.01)

(56) References Cited

PUBLICATIONS

Yang et al., RSC Advance, 2012, 2, 2208-2210.*
Zhou et al., Nanotechnology, 22(2011)045704.*
Li et al., Nature Nanotechnology, 2008, 3, 101-105.*
Appeal Decision from Patent Appeal No. 77-509, in re Best, et al., Oct. 13, 1977; 6 pages.
Ling Sun, et al., "Graphene oxide adsorption enhanced by in situ reduction with sodium hydrosulfite to remove acridine orange from aqueous solution," Journal of Hazardous Materials, 2012, pp. 101-110, vol. 203-204.
Office Action issued in corresponding Korean Patent Application No. 2014-7036092 dated Feb. 19, 2019 and English language translation thereof, 8 pages.

\* cited by examiner

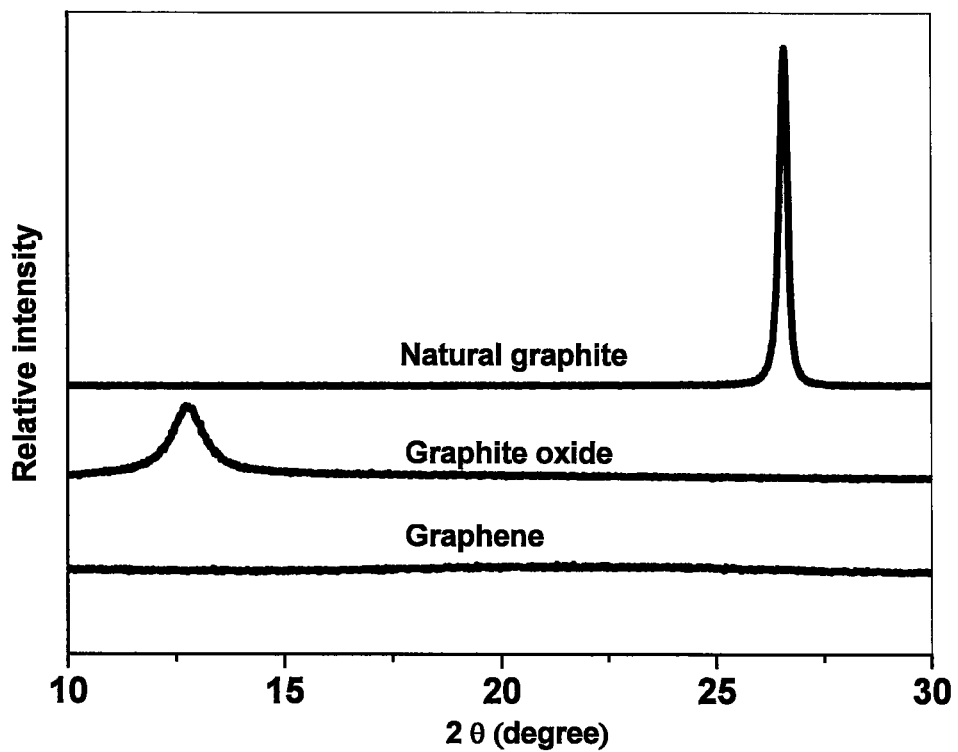

US 10,347,916 B2

GRAPHENE POWDER, METHOD FOR PRODUCING GRAPHENE POWDER AND ELECTRODE FOR LITHIUM ION BATTERY CONTAINING GRAPHENE POWDER

CROSS REFERENCE TO RELATED APPLICATIONS

This application is a national stage entry of International Application No. PCT/CN2013/076173, filed on May 23, 2013, which claims the benefit of priority to Chinese Patent Application No. 201210196429.3, filed Jun. 6, 2012, the entire contents of which are herein incorporated by reference.

TECHNICAL FIELD

The present invention relates to a highly dispersible and highly conductive graphene powder and a method for producing the same.

BACKGROUND ART

Graphene is a two-dimensional crystal composed of carbon atoms and is a source material that has been attracting considerable attention since it was discovered in 2004. Graphene has excellent electrical, thermal, optical and mechanical properties and is expected to be applied in a wide range of fields such as battery materials, materials for energy storage, electronic devices and composite materials.

In order to realize such applications of graphene, making the preparation method efficient to reduce costs and an improvement in dispersibility are required tasks.

Examples of the production method of graphene include a mechanical exfoliation method, a CVD (Chemical Vapor Deposition) method, a CEG (Crystal Epitaxial Growth) method and the like, and these methods have low productivity and are not suitable for mass production. In contrast, an oxidation-reduction method (a method of subjecting natural graphite to an oxidation treatment to obtain a graphite oxide or a graphene oxide and then preparing graphene by a reductive reaction) is capable of attaining a large-scale synthesis of graphene and is a very important method for putting graphene into practical use.

Examples of the conventional technique of the oxidation-reduction method include a high temperature heat reduction method and a method of reducing with hydrazines. In Patent Document 1, for example, although a graphite oxide is allowed to undergo a heat reduction at a high temperature of 1050° C. to prepare graphene, with regard to the conditions, since the method is conducted at high temperatures, expensive facilities are required. Ruoff, et al. employed hydrazine hydrate as a reducing agent and graphite oxide was reduced by a 24-hour reaction at 100° C. in water to prepare graphene (Non-Patent Document 1). However, hydrazine reducing agents are highly toxic and are difficult to be industrially utilized.

Moreover, since graphene is a nanocarbon and is very difficult to be dispersed due to its high specific surface area, an improvement in dispersibility is a very important task for the application of graphene. Although Li, et al. obtained graphene stably dispersed in water by adding aqueous ammonia during reducing graphite oxide with hydrazine hydrate as a reducing agent to allow graphene to be electrically charged (Non-Patent Document 2), in this method, the solvent is restricted to water.

In Patent Document 2, a relatively stable graphene dispersion was prepared from graphite oxide using phenolamines as reducing agents. Since the graphite oxide cannot be sufficiently reduced with the phenolamines, sufficient conductivity cannot be attained. Although Liu, et al. and Kaminska, et al. employed dopamine (Non-Patent Document 3) and an azide of dopamine (Non-Patent Document 4), respectively, as a reducing agent to reduce graphite oxide, since the graphite oxide could not be sufficiently reduced with the dopamines, graphene with high conductivity could not be attained.

PRIOR ART DOCUMENTS

Patent Documents

Patent Document 1: U.S. Pat. No. 7,658,901
Patent Document 2: Chinese Laid-open Patent Publication CN102398900A

Non-Patent Documents

Non-Patent Document 1: Ruoff, et al. Carbon, 2007, 45, 1558
Non-Patent Document 2: Li, et al. Nature Nanotechnology, 2008, 3, 101
Non-Patent Document 3: Liu, et al. J. Phys. Chem. C, 2012, 116, 3334-3341
Non-Patent Document 4: Kaminska, et al. Appl. Mater. Interface, 2012, 4, 1016

SUMMARY OF THE INVENTION

Problems to be Solved by the Invention

In this way, there hasn't been obtained graphene having high dispersibility in an organic solvent while maintaining high conductivity till now. On that account, there has been no disclosure about an example in which graphene is successfully employed as a conductive additive for a lithium ion battery electrode up to the present time.

The first object of the present invention is to prepare highly conductive and highly dispersible graphene and the second object is to obtain an electrode for a lithium ion battery with good output characteristics and cycle characteristics by utilizing highly conductive and highly dispersible graphene.

Solutions to the Problems

The present inventors have found that highly conductive and highly dispersible graphene can be obtained by allowing the specific amount of a compound having a catechol group to stick to graphene.

That is, the present invention is directed to a graphene powder allowing a compound having a catechol group to stick to the graphene surface at a weight ratio thereof to graphene of 5% or more and 50% or less, the element ratio of oxygen to carbon in the graphene powder measured by X-ray photoelectron spectroscopy being 0.06 or more and 020 or less.

Effects of the Invention

The graphene powder according to the present invention can be imparted with dispersibility in an organic solvent while maintaining high conductivity by allowing a compound having a catechol group to moderately stick to the graphene surface. Furthermore, by using such highly dispersible and highly conductive graphene together with a binder and an electrode active material, it is possible to provide an electrode for a lithium ion battery with excellent discharge performance.

BRIEF DESCRIPTION OF THE DRAWING

FIG. 1 shows a comparison of the X-ray diffraction spectra of the graphene produced in Example 1 according to the present invention, the graphite oxide produced in Synthesis Example 1 and the natural graphite as a raw material. As shown in the FIGURE, compared to sharp diffraction peaks of the natural graphite and the graphite oxide, there is almost no diffraction peak derived from graphite in the graphene and this suggests that sufficiently thin graphene is prepared.

EMBODIMENTS OF THE INVENTION

<Graphene Powder>

The graphene powder refers to a powder containing graphene and the graphene powder according to the present invention is one that allows a compound having a catechol group to stick to the graphene surface.

[Graphene]

Graphene has a structure composed of single-layer graphene sheets stacked together and has a flaky form. Although no particular restriction is put on the thickness of graphene, it is preferably 100 nm or less, more preferably 50 nm or less and further preferably 20 nm or less. Also no particular restriction is put on the size in the horizontal direction of graphene, the lower limit is preferably 0.5 μm or more, more preferably 0.7 μm or more and further preferably 1 μm or more and the upper limit is preferably 50 μm or less, more preferably 10 μm or less and further preferably 5 μm or less. In this connection, the size in the horizontal direction of graphene refers to an average of the maximum length of the major axis and the minimum length of the minor axis of the graphene plane.

[Compound Having a Catechol Group]

The graphene powder according to the present invention allows a compound having a catechol group to stick to the surface. Since the compound having a catechol group has an aromatic ring, it is apt to stick to the graphene surface due to π-π stacking interaction. Moreover, since the catechol group has plural phenolic hydroxyl groups, it has a great effect of enhancing the dispersibility. On that account, the graphene allowing a compound having a catechol group to stick to the surface has an extremely high level of dispersion stability. Actually, the sticking or attaching or absorbing ability of catchol group is learned from an ocean biology named mussel. Mussel possesses magic adhesive ability and it can attach to different kinds of surfaces, because catechol groups exist in the adhesive protein of mussel. Compounds containing catechol group can mimetic the magic adhesive ability of mussel and can attach to the surface of graphene.

Specifically, this so-called compound having a catechol group refers to a compound with a structure in which a portion or all of the 3-position to 6-position of 1,2-benzendiol are modified. Moreover, catechol itself is also included.

With regard to the above-mentioned compound having a catechol group, one kind or two or more kinds of compounds selected from the group consisting of catechol, dopamine hydrochloride, dopa, noradrenalin, 3,4-dihydroxybenzoic acid, 3,4-dihydroxyphenylacetic acid, caffeic acid, 4-methylcatechol and 4-tert-butylpyrocatechol are desirable. Above all, catechol, dopamine hydrochloride, and dopa are more preferred, and of these, dopamine hydrochloride and dopa are especially preferred.

In the present invention, allowing a compound having a catechol group to stick to the graphene surface refers to allowing the compound having a catechol group to remain in a graphene powder after performing an operation of allowing a compound having a catechol group to stick to the surface, performing a filtration to obtain a graphene powder, repeating a washing process, in which the resulting graphene powder is dispersed in 100 times its weight of water and filtered, 2 or more times, and then drying it by a freeze-drying method, a spray-dry method or the like.

The weight ratio of the compound having a catechol group sticking to graphene in the present invention is 5% or more and 50% or less. In the case where the proportion of the compound having a catechol group on the surface is too low, it is not possible to impart the graphene powder with sufficient dispersibility. On the other hand, in the case where the proportion of the compound having a catechol group is too high, the conductivity of the graphene powder is lowered. The weight ratio of the compound having a catechol group in the graphene powder is preferably 10% or more, further preferably 15% or more. Moreover, it is preferably 30% or less, further preferably 25% or less.

The method of allowing a compound having a catechol group to stick on the surface is not particularly limited. The compound having a catechol group and graphene may be mixed and graphite oxide may be reduced in the presence of the compound having a catechol group.

No particular restriction is put on the method of mixing a compound having a catechol group and graphene and a known mixer and kneader may be used. Specifically, examples thereof include a method of utilizing a self-operating mortar, a triple roll mill, a bead mill, a planetary ball mill, a homogenizer, a planetary mixer, a biaxial kneader or the like. Of these, a planetary ball mill is suitable for mixing two different powders.

The quantitative method of a compound having a catechol group contained in the graphene powder varies with the kind of the compound having a catechol group. In the case where the compound having a catechol group contains nitrogen atoms or sulfur atoms, it can be quantitatively determined from the proportion of nitrogen atoms or sulfur atoms to carbon atoms measured by X-ray photoelectron spectroscopy or the like. In the case where the compound having a catechol group does not have nitrogen atom or sulfur atom, it can be quantitatively determined by quantitatively analyzing a compound having a catechol group by methods of analysis such as thermal desorption GC-MS and TPD-MS, and converting the value thus obtained into a weight ratio thereof to the total weight of the graphene powder.

Above all, in the case where the compound having a catechol group allowed to stick to the surface is dopamine hydrochloride, or dopa, it is preferred to analyze nitrogen atoms by X-ray photoelectron spectroscopy. In this case, the proportion of nitrogen atoms to carbon atoms in the graphene powder measured by X-ray photoelectron spectroscopy is preferably 0.005 or more and 0.02 or less, further preferably 0.01 or more and 0.015 or less.

[Oxygen/Carbon Element Ratio]

The oxygen atoms in the graphene powder come from two sources. One is from oxygen atoms contained in the functional groups, which the graphene itself has, such as a hydroxyl group, a carboxyl group and a carbonyl group. The other is from oxygen atoms contained in the compound having a catechol group sticking to the graphene surface.

In the present invention, the element ratio of oxygen to carbon in the graphene powder needs to be 0.06 or more and 0.2 or less. Moreover, it is preferably 0.08 or more and 0.15 or less, further preferably 0.09 or more and 0.13 or less. If the amount of oxygen atoms in the graphene powder is too small, the dispersibility of graphene powder is deteriorated. If the amount of oxygen atoms in the graphene powder is too large, the graphene is in the state of not being sufficiently reduced and the conductivity is lowered.

The element ratio of oxygen to carbon in the graphene powder can be quantitatively determined by X-ray photoelectron spectroscopy. In X-ray photoelectron spectroscopy, the surface of a sample put into an ultra-high vacuum is irradiated with soft X-rays and photoelectrons emitted from the surface are detected by an analyzer. By performing a wide scan to measure this photoelectron and determining the binding energy value of a bound electron in a material, information about the elements in the material is obtained. Furthermore, it is possible to quantitatively determine the element ratio using the peak area ratio.

<Production Method of Graphene Powder>

The graphene powder according to the present invention may be produced by, as an example, a production method comprising the step of reducing a graphite oxide in the presence of a compound having a catechol group with a reducing agent different from the compound having a catechol group.

[Graphite Oxide]

The graphite oxide in the present invention refers to a material obtained by allowing graphite to be oxidized and has peaks at 9 to 13.0° which are the peaks peculiar to graphite oxide in the X-ray diffraction measurement. With regard to such a graphite oxide, the structure collapses depending on the conditions such as pH in the solution and one-layer to few-layer graphene sheets are formed depending on the degree of oxidation.

No particular limitation is put on the preparation method of a graphite oxide and a known method such as Hummers' method may be used. Moreover, commercial graphite oxide may be purchased. As the preparation method of a graphite oxide used for the present invention, a case of employing Hummers' method will be exemplified below.

Although the graphite as the raw material of the graphite oxide may be either artificial graphite or natural graphite, natural graphite is preferably used. The mesh number for raw graphite is preferably 300 to 20000, further preferably 500 to 5000.

Graphite (graphite powder) and sodium nitrate are added to concentrated sulfuric acid. During stirring, potassium permanganate is gradually added so that the temperature does not rise. The mixture is allowed to undergo a reaction with stirring for 0.2 to 5 hours at 25 to 50° C. Afterward, the reaction mixture is added and diluted with ion-exchanged water to prepare a suspension and the suspension is allowed to undergo a reaction for 5 to 50 minutes at 80 to 100° C. Finally, hydrogen peroxide and deionized water are added and allowed to undergo a reaction for 1 to 30 minutes to obtain a graphite oxide suspension. The resulting graphite oxide suspension is filtered and washed to obtain a graphite oxide gel. The solvent can be removed from the graphite oxide gel by a freeze-drying method, a spray-dry method or the like to obtain a graphite oxide powder.

The specifications given for each reactant are, as an example, relative to 10 g of graphite, 150 to 300 ml of concentrated sulfuric acid, 2 to 8 g of sodium nitrate, 10 to 40 g of potassium permanganate and 40 to 80 g of hydrogen peroxide. When sodium nitrate and potassium permanganate are added, the temperature is controlled by means of an ice bath. When hydrogen peroxide and deionized water are added, the mass of deionized water is 10 to 20 times the mass of hydrogen peroxide. It is preferred to utilize concentrated sulfuric acid with a mass concentration of 70% or more, and it is more preferred to utilize that with a mass concentration of 97% or more.

Although the graphite oxide has high dispersibility, since it is an insulator in itself, it cannot be used as a conductive additive or the like. In the case where the oxidation degree of the graphite oxide is too high, the conductivity of the graphene powder obtained by reduction may deteriorate. As such, it is preferred that the ratio of oxygen atoms to carbon atoms in the graphite oxide be 0.5 or less. Moreover, in the case where the inner part of graphite is not well oxidized, it becomes difficult to obtain flaky graphene powder when the graphite oxide is reduced. Accordingly, it is desirable that the peaks peculiar to graphite not be detected when the graphite oxide is subjected to the X-ray diffraction measurement.

[Reduction of Graphite Oxide in the Presence of a Compound Having a Catechol Group]

In order to reduce graphite oxide in the presence of a compound having a catechol group, the compound having a catechol group and the graphite oxide need to be mixed moderately. For example, the graphite oxide and the compound having a catechol group may be dispersed in a solvent. In this case, although it is preferred that both the graphite oxide and the compound having a catechol group be completely dissolved, a portion thereof may be left undissolved and remain solid. As the solvent, a polar solvent is preferred and although not limited to the following, examples thereof include water, ethanol, methanol, 1-propanol, 2-propanol, N-methylpyrrolidone, dimethylformamide, dimethylacetamide, dimethyl sulfoxide, γ-butyrolactone and the like. In order to reduce it in the presence of a compound having a catechol group, the solvent is not always necessary as long as the graphite oxide and the compound having a catechol group are moderately mixed. Those in the solid state may be mixed by kneading.

The graphite oxide is reduced with a reducing agent having no catechol group (hereinafter, a reducing agent for short) in the presence of a compound having a catechol group. Since the catechol group has an aromatic ring, it is apt to be adsorbed on the graphite oxide surface. On that account, in the case where the graphite oxide is reduced by the compound having a catechol group, an oxide is adsorbed and excessively left on the surface and the conductivity deteriorates. As the reducing agent, an agent less apt to be adsorbed on the graphite oxide surface is preferred and a material having no aromatic ring is preferred. In the point that an oxide is less apt to remain after reduction, as the reducing agent in the present invention, an inorganic reducing agent is preferred. Examples of the inorganic reducing agent to be used include sodium dithionite, potassium dithionite, phosphorous acid, sodium borohydride, hydrazine and the like. Of these, sodium dithionite and potassium dithionite, which are capable of reducing graphite oxide readily at ambient temperature, are especially preferred.

Although the amount of the reducing agent is not particularly restricted, the amount capable of sufficiently reducing the graphite oxide is preferred and it is desirable that the mass ratio of the reducing agent to the graphite oxide be 1:1 to 3:1.

Although no particular restriction is put on the concentration of graphite oxide in the graphite oxide dispersion for reductive reaction, it is preferably 0.1 to 100 mg/ml. After reductive reaction, filtration and washing with water, the solvent is removed by freeze-drying, spray-dry or the like to obtain a graphene powder.

During the reduction process, the weight ratio of the compound having a catechol group to the graphite oxide in the mixture, is not particularly limited. Since the amount of the compound having a catechol group left on the graphene surface is affected, it is preferably 0.2 or more and 4 or less, further preferably 0.5 or more and 2 or less.

As stated above, the graphene prepared by reducing a graphite oxide with a reducing agent having no catechol group in the presence of a compound having a catechol group has high dispersibility and it is possible to allow it to be suitably dispersed especially in a polar solvent. The solvent suitable for the dispersion is exemplified by N-methylpyrrolidone, γ-butyrolactone, dimethylformamide, dimethylacetamide, carboxymethyl cellulose and the like. Having high dispersibility in these solvents enables it to be suitably used as a material for a battery.

<Electrode for Lithium Ion Battery>

A conductive additive is usually contained in an electrode for a lithium ion battery. The conductive additive may be composed only of the graphene powder according to the present invention and further other materials may be added. Although other conductive additives to be added are not particularly limited, examples thereof include carbon blacks such as furnace black, ketjen black and acetylene black, graphites such as natural graphite (scalelike graphite and the like) and artificial graphite, conductive fibers such as carbon fiber and metal fiber, metal powders such as copper, nickel, aluminum and silver powders, and the like.

Although the electrode active material is roughly classified into a positive electrode active material and a negative electrode active material, in either case, the present invention may be utilized.

Although the positive electrode active material is not particularly limited, examples thereof include composite oxides of lithium and a transition metal such as lithium cobaltate ($LiCoO_2$), lithium nickelate ($LiNiO_2$), spinel type lithium manganate ($LiMn_2O_4$) or a ternary system material in which a portion of cobalt is substituted with nickel and manganese ($LiMn_xNi_yCo_{1-x-y}O_2$), olivine-based (phosphate-based) active materials such as lithium iron phosphate ($LiFePO_4$) and lithium manganese phosphate ($LiMnPO_4$), metal oxides such as $V_2O_5$, metallic compounds such as $TiS_2$, $MoS_2$ and $NbSe_2$, and the like.

Although the negative electrode active material is not particularly limited, examples thereof include carbon-based materials such as natural graphite, artificial graphite and hard carbon, silicon compounds in which SiO, SiC, SiOC and the like are the basic constituent elements, metal oxides such as manganese oxide (MnO) and cobalt oxide (CoO) which are capable of undergoing a conversion reaction with lithium ions, and the like.

The binder can be selected from fluorine-based polymers such as polyvinylidene fluoride (PVDF) and polytetrafluoroethylene (PTFE) and rubbers such as styrene-butadiene rubber (SBR) and natural rubber.

By mixing active material, binder and conductive additive with a suitable amount of solvent to prepare an electrode paste, applying the electrode paste to a current collector and drying it, an electrode for a lithium ion battery can be prepared. Examples of the electrode paste solvent include N-methylpyrrolidone, γ-butyrolactone, carboxymethyl cellulose, dimethylacetamide and the like and N-methylpyrrolidone is especially used frequently.

Since the graphene powder according to the present invention allows a compound having a catechol group to stick to the surface, it has good dispersibility in an electrode paste solvent. On that account, with regard to the electrode for a lithium ion battery according to the present invention, by allowing the graphene powder to be well dispersed in the electrode, it is possible to enhance the electron conductivity in the electrode and to provide an electrode for a lithium ion battery with excellent performance.

EXAMPLES

Chemicals Used in the Present Invention

Natural graphite powder: purchased from Shanghai Yi Fan Shi Mo Co., Ltd.

Concentrated sulfuric acid, sodium nitrate, potassium permanganate, hydrogen peroxide, dopamine hydrochloride, dopa, catechol, sodium dithionite, potassium dithionite, hydrazine hydrate, N-methylpyrrolidone and the like were purchased from a reagent company belonging to China National Pharmaceutical Group Corporation or Aladdin Reagents Co., Ltd.

Measurement Example 1

Powder Resistance Measurement

By forming a sample into a disk-shaped specimen with a diameter of about 20 mm and a density of 1 g/cm$^3$, the electrical conductivity of the sample was measured using high resistivity meter MCP-HT450 and low resistivity meter MCP-T610 available from Mitsubishi Chemical Corporation.

Measurement Example 2

X-Ray Photoelectron Measurement

The X-ray photoelectron measurement for each sample was performed using Quantera SXM (available from ULVAC-PHI, Incorporated). The excited X-ray is a monochromatic Al K$α_{1,2}$ (1486.6 eV), the diameter of X-ray is 200 μm, and the photoelectron take-off angle is a 45 degree angle.

Measurement Example 3

Evaluation of Performance in Dispersibility

The performance in dispersibility was measured in the following manner. 1 part by weight of a graphene powder prepared in the following Example and 99 parts by weight of N-methylpyrrolidone were placed in a sample bottle, and the bottle was subjected to ultrasonication with an ultrasonic washer for 30 minutes, after which the contents were allowed to settle and the sedimentation state was visually observed. In the case where the solution was in a state of being visually homogeneous, it was judged to be in the state of good dispersibility. In the case where the top portion of solution became clear or a precipitate was observed at the bottom portion of solution, it was judged to be in the state of being layered.

Measurement Example 4

Battery Performance Evaluation

The discharge capacity was measured in the following manner. With a planetary mixer, 1 part by weight of a graphene powder prepared in the following Example, 90 parts by weight of lithium iron phosphate as an electrode active material, 4 parts by weight of acetylene black as a conductive additive, 5 parts by weight of polyvinylidene fluoride as a binder and 100 parts by weight of N-methyl-pyrrolidone as a solvent were mixed to obtain an electrode paste. The electrode paste was applied to a sheet of aluminum foil (18 μm in thickness) using a doctor blade (300 μm) and was dried for 15 minutes at 200° C. to obtain an electrode plate.

An electrode plate prepared was cut into pieces with a diameter of 15.9 mm to give a positive electrode, a sheet of lithium foil was cut into pieces with a diameter of 16.1 mm and a thickness of 0.2 mm to give a negative electrode, a sheet of Celgard #2400 (available from Celgard KK) was cut into pieces with a diameter of 17 mm to give a separator, a 1M $LiPF_6$-containing solvent of ethylene carbonate:diethyl carbonate=7:3 was employed as an electrolytic solution, and 2042 type coin battery was prepared to carry out the electrochemical evaluation. A charge and discharge measurement was performed 3 times at the rate of 1 C, the upper limit voltage of 4.0 V and the lower limit voltage of 2.5 V, and the capacity at the third discharging was defined as the discharge capacity.

Synthesis Example 1

Preparation method of graphite oxide: A 1500-mesh natural graphite powder (Shanghai Yi Fan Shi Mo Co., Ltd.) was employed as a raw material. 330 ml of 98% concentrated sulfuric acid, 5.25 g of sodium nitrate and 31.5 g of potassium permanganate were added to 15 g of the natural graphite powder in an ice bath, and the mixture was mechanically stirred for 1.5 hours. The temperature of the liquid mixture was maintained at 20° C. or lower. The liquid mixture was removed from the ice bath and was allowed to undergo a reaction with stirring for 2.5 hours in a water bath at 35° C., after which a suspension obtained by adding 690 ml of ion-exchanged water to the mixture was allowed to undergo a reaction for an additional 15 minutes at 90° C. Finally, 1020 ml of ion-exchanged water and 50 ml of hydrogen peroxide were added to the reaction mixture, and a reaction was carried out for 5 minutes to obtain a graphite oxide dispersion. The dispersion was filtered while hot, the metal ions contained therein were washed with dilute hydrochloric acid solution, the acid contained therein was washed with ion-exchanged water and washing was repeated until the pH had reached 7 to prepare a graphite oxide gel. The elemental composition ratio of oxygen atoms to carbon atoms in the graphite oxide was determined to be 0.45.

Example 1

(1) Preparation method of graphite oxide dispersion

The graphite oxide gel prepared in Synthesis Example 1 was diluted with deionized water to the concentration of 5 mg/ml and subjected to an ultrasonic treatment, after which a homogeneously dispersed ocher graphite oxide dispersion was obtained.

(2) Preparation method of graphene powder

To 200 ml of the dispersion of a graphite oxide, 0.5 g of dopamine hydrochloride was added as a dispersing agent, and 3 g of sodium dithionite was added as a reducing agent. The reductive reaction was allowed to undergo at 40° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of graphite oxide before the reduction was determined to be $8.70 \times 10^{-4}$ S/m and the electrical conductivity of the graphene powder after the reduction was determined to be $2.33 \times 10^3$ S/m.

The graphene powder after the reduction was measured by X-ray photoelectron spectroscopy according to Measurement Example 2, whereupon the element ratio of oxygen to carbon was 0.11 and the element ratio of nitrogen to carbon was 0.013. By assuming that all of the nitrogens were derived from dopamine hydrochloride, the weight ratio of dopamine hydrochloride to graphene was calculated to be 18%.

The performance in dispersibility of the graphene powder was measured according to Measurement Example 3, whereupon it was allowed to be stably dispersed even after 30 days and no sedimentation was observed.

An electrode for a lithium ion battery containing the graphene powder was prepared according to Measurement Example 4 and the discharge capacity was measured, whereupon it was determined to be 152 mAh/g.

The results are collected in Table 1.

Example 2

(1) A graphite oxide dispersion was obtained in the same manner as in Example 1

(2) Preparation method of graphene powder

To 200 ml of the dispersion of a graphite oxide, 0.5 g of catechol was added as a dispersing agent and 3 g of sodium dithionite was added as a reducing agent. The reductive reaction was allowed to undergo at 40° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of graphite oxide before the reduction was determined to be $8.70 \times 10^{-4}$ S/m and the electrical conductivity of the graphene powder after the reduction was determined to be $1.52 \times 10^3$ S/m.

The graphene powder after the reduction was measured by X-ray photoelectron spectroscopy according to Measurement Example 2, whereupon the element ratio of oxygen to carbon was 0.11. The graphene powder after the reduction was measured by thermal desorption GC-MS, whereupon the weight ratio of catechol in the graphene powder was 16%.

The performance in dispersibility of the graphene powder was measured according to Measurement Example 3, whereupon it was allowed to be stably dispersed even after 30 days and no sedimentation was observed.

An electrode for a lithium ion battery containing the graphene powder was prepared according to Measurement Example 4 and the discharge capacity was measured, whereupon it was determined to be 150 mAh/g.

The results are collected in Table 1.

Example 3

(1) A graphite oxide dispersion was obtained in the same manner as in Example 1

(2) Preparation method of graphene powder

To 200 ml of the dispersion of a graphite oxide, 0.5 g of dopa was added as a dispersing agent and 3 g of sodium dithionite was added as a reducing agent. The reductive reaction was allowed to undergo at 40° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of graphite oxide before the reduction was determined to be $8.70 \times 10^{-4}$ S/m and the electrical conductivity of the graphene powder after the reduction was determined to be $4.35 \times 10^3$ S/m.

The graphene powder after the reduction was measured by X-ray photoelectron spectroscopy according to Measurement Example 2, whereupon the element ratio of oxygen to carbon was 0.11 and the element ratio of nitrogen to carbon was 0.012. By assuming that all of the nitrogens were derived from dopa, the weight ratio of dopa to graphene was calculated to be 17%.

The performance in dispersibility of the graphene powder was measured according to Measurement Example 3, whereupon it was allowed to be stably dispersed even after 30 days and no sedimentation was observed.

An electrode for a lithium ion battery containing the graphene powder was prepared according to Measurement Example 4 and the discharge capacity was measured, whereupon it was determined to be 147 mAh/g.

The results are collected in Table 1.

Example 4

(1) A graphite oxide dispersion was obtained in the same manner as in Example 1

(2) Preparation method of graphene powder

To 200 ml of the dispersion of a graphite oxide, 0.5 g of dopamine hydrochloride was added as a dispersing agent and 3 g of potassium dithionite was added as a reducing agent. The reductive reaction was allowed to undergo at room temperature of 23° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $2.21 \times 10^3$ S/m.

The graphene powder after the reduction was measured by X-ray photoelectron spectroscopy according to Measurement Example 2, whereupon the element ratio of oxygen to carbon was 0.12 and the element ratio of nitrogen to carbon was 0.011. By assuming that all of the nitrogens were derived from dopamine hydrochloride, the weight ratio of dopamine hydrochloride to graphene was calculated to be 15%.

The performance in dispersibility of the graphene powder was measured according to Measurement Example 3, whereupon it was allowed to be stably dispersed even after 30 days and no sedimentation was observed.

An electrode for a lithium ion battery containing the graphene powder was prepared according to Measurement Example 4 and the discharge capacity was measured, whereupon it was determined to be 151 mAh/g.

The results are collected in Table 1.

Example 5

(1) A graphite oxide dispersion was obtained in the same manner as in example 1.

(2) Preparation method of graphene powder: To 200 ml of the dispersion of a graphite oxide, 0.5 g of catechol was added as a dispersing agent and 3 g of potassium dithionite was added as a reducing agent. The reductive reaction was allowed to undergo at room temperature of 23° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $1.49 \times 10^3$ S/m.

The graphene powder after the reduction was measured by X-ray photoelectron spectroscopy according to Measurement Example 2, whereupon the element ratio of oxygen to carbon was 0.12.

The graphene powder after the reduction was measured by thermal desorption GC-MS, whereupon the weight ratio of catechol in the graphene powder was 14%.

The performance in dispersibility of the graphene powder was measured according to Measurement Example 3, whereupon it was allowed to be stably dispersed even after 30 days and no sedimentation was observed.

An electrode for a lithium ion battery containing the graphene powder was prepared according to Measurement Example 4 and the discharge capacity was measured, whereupon it was determined to be 148 mAh/g.

The results are collected in Table 1.

Example 6

(1) A graphite oxide dispersion was obtained in the same manner as in Example 1

(2) Preparation method of graphene powder: To 200 ml of the dispersion of a graphite oxide, 0.5 g of dopa was added as a dispersing agent and 3 g of potassium dithionite was added as a reducing agent. The reductive reaction was allowed to undergo at room temperature of 23° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical Properties and Performance of Graphene

The electrical conductivity of a graphene powder before and after the reduction was measured according to Measurement Example 1. The electrical conductivity of a graphite oxide before the reduction was determined to be 8.70×S/m and the electrical conductivity of the graphene powder after the reduction was determined to be $4.13 \times 10^3$ S/m.

The graphene powder after the reduction was measured by X-ray photoelectron spectroscopy according to Measurement Example 2, whereupon the element ratio of oxygen to carbon was 0.12 and the element ratio of nitrogen to carbon was 0.011. By assuming that all of the nitrogens were derived from dopa, the weight ratio of dopa to graphene was calculated to be 15%.

The performance in dispersibility of the graphene powder was measured according to Measurement Example 3, whereupon it was allowed to be stably dispersed even after 30 days and no sedimentation was observed.

An electrode for a lithium ion battery containing the graphene powder was prepared according to Measurement Example 4 and the discharge capacity was measured, whereupon it was determined to be 145 mAh/g.

The results are collected in Table 1.

Example 7

(1) A graphite oxide dispersion was obtained in the same manner as in Example 1

(2) Preparation method of graphene powder: To 200 ml of the dispersion of a graphite oxide, 0.5 g of dopamine hydrochloride was added as a dispersing agent and 3 g of sodium dithionite was added as a reducing agent. The reductive reaction was allowed to undergo at 100° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical Properties and Performance of Graphene

The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $1.01 \times 10^4$ S/m.

The graphene powder after the reduction was measured by X-ray photoelectron spectroscopy according to Measurement Example 2, whereupon the element ratio of oxygen to carbon was 0.11 and the element ratio of nitrogen to carbon was 0.014. By assuming that all of the nitrogens were derived from dopamine hydrochloride, the weight ratio of dopamine hydrochloride to graphene was calculated to be 19%.

The performance in dispersibility of the graphene powder was measured according to Measurement Example 3, whereupon it was allowed to be stably dispersed even after 30 days and no sedimentation was observed.

An electrode for a lithium ion battery containing the graphene powder was prepared according to Measurement Example 4 and the discharge capacity was measured, whereupon it was determined to be 142 mAh/g.

The results are collected in Table 1.

Example 8

(1) A graphite oxide dispersion was obtained in the same manner as in Example 1

(2) Preparation method of graphene powder: To 200 ml of the dispersion of a graphite oxide, 0.5 g of catechol was added as a dispersing agent and 3 g of sodium dithionite was added as a reducing agent. The reductive reaction was allowed to undergo at 100° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $6.61 \times 10^3$ S/m.

The graphene powder after the reduction was measured by X-ray photoelectron spectroscopy according to Measurement Example 2, whereupon the element ratio of oxygen to carbon was 0.11.

The graphene powder after the reduction was measured by thermal desorption GC-MS, whereupon the weight ratio of catechol in the graphene powder was 15%.

The performance in dispersibility of the graphene powder was measured according to Measurement Example 3, whereupon it was allowed to be stably dispersed even after 30 days and no sedimentation was observed.

An electrode for a lithium ion battery containing the graphene powder was prepared according to Measurement Example 4 and the discharge capacity was measured, whereupon it was determined to be 145 mAh/g.

The results are collected in Table 1.

Comparative Example 1

(1) A graphite oxide dispersion was obtained in the same manner as in Example 1

(2) Preparation method of graphene powder: To 200 ml of the dispersion of a graphite oxide, 3 g of dopamine hydrochloride was added and allowed to undergo a reaction at 40° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained, (3) Physical properties and performance of graphene The electrical conductivity of a graphene powder before and after the reduction was measured according to Measurement Example 1. The electrical conductivity of a graphite oxide before the reduction was determined to be $8.70 \times 10^{-4}$ S/m and the increase in electrical conductivity of the powder after the reduction is small and it is an insulator.

The graphene powder after the reduction was measured by X-ray photoelectron spectroscopy according to Measurement Example 2, whereupon the element ratio of oxygen to carbon was 0.41 and the element ratio of nitrogen to carbon was 0.006. By assuming that all of the nitrogens were derived from dopamine hydrochloride, the weight ratio of dopamine hydrochloride to graphene was calculated to be 6%.

The measurement of the performance in dispersibility of the powder and the measurement of an electrode for a lithium ion battery containing the powder are meaningless.

Comparative Example 2

(1) A Graphite Oxide Dispersion was Obtained in the Same Manner as in Example 1

(2) Preparation Method of Graphene Powder: To 200 ml of the dispersion of a graphite oxide, 3 g of dopamine hydrochloride was added and allowed to undergo a reaction at 100° C. as the reductive reaction temperature for 24 hours as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical Properties and Performance of Graphene

The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $6.81 \times 10^{2}$ S/m.

The graphene powder after the reduction was measured by X-ray photoelectron spectroscopy according to Measurement Example 2, whereupon the element ratio of oxygen to carbon was 0.23 and the element ratio of nitrogen to carbon was 0.013. By assuming that all of the nitrogens were derived from dopamine hydrochloride, the weight ratio of dopamine hydrochloride to graphene was calculated to be 17%.

The performance in dispersibility of the graphene powder was measured according to Measurement Example 2, whereupon it was allowed to be stably dispersed even after 30 days and no sedimentation was observed.

An electrode for a lithium ion battery containing the graphene powder was prepared according to Measurement Example 3 and the discharge capacity was measured, whereupon it was determined to be 129 mAh/g.

The results are collected in Table 1.

Comparative Example 3

(1) A graphite oxide dispersion was obtained in the same Manner as in Example 1

(2) Preparation method of graphene powder: To 200 ml of the dispersion of a graphite oxide, 3 g of catechol was added and allowed to undergo a reaction at 40° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of a graphite oxide before the reduction was determined to be $8.70 \times 10^{-4}$ S/m and the increase in electrical conductivity of the powder after the reduction is small and it is an insulator.

The graphene powder after the reduction was measured by X-ray photoelectron spectroscopy according to Measurement Example 2, whereupon the element ratio of oxygen to carbon was 0.42.

The graphene powder after the reduction was measured by thermal desorption GC-MS, whereupon the weight ratio of catechol in the graphene powder was 13%.

The measurement of the performance in dispersibility of the powder and the measurement of an electrode for a lithium ion battery containing the powder are meaningless.

Comparative Example 4

(1) A Graphite Oxide Dispersion was Obtained in the Same Manner as in Example 1

(2) Preparation Method of Graphene Powder: To 200 ml of the dispersion of a graphite oxide, 3 g of catechol was added and allowed to undergo a reaction at 100° C. as the reductive reaction temperature for 24 hours as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $5.83 \times 10^{2}$ S/m.

The graphene powder after the reduction was measured by X-ray photoelectron spectroscopy according to Measurement Example 2, whereupon the element ratio of oxygen to carbon was 0.24.

The graphene powder after the reduction was measured by thermal desorption GC-MS, whereupon the weight ratio of catechol in the graphene powder was 14%.

The performance in dispersibility of the graphene powder was measured according to Measurement Example 2, whereupon it was allowed to be stably dispersed even after 30 days and no sedimentation was observed.

An electrode for a lithium ion battery containing the graphene powder was prepared according to Measurement Example 3 and the discharge capacity was measured, whereupon it was determined to be 121 mAh/g.

The results are collected in Table 1.

Comparative Example 5

(1) A graphite oxide dispersion was obtained in the same manner as in Example 1

(2) Preparation method of graphene powder: To 200 ml of the dispersion of a graphite oxide, 3 g of sodium dithionite was added as a reducing agent. The reductive reaction was allowed to undergo at 40° C. as the reductive reaction temperature for 30 minutes as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical Properties and Performance of Graphene

The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $6.90 \times 10^3$ S/m.

The graphene powder after the reduction was measured by X-ray photoelectron spectroscopy according to Measurement Example 2, whereupon the element ratio of oxygen to carbon was 0.090.

The performance in dispersibility of the graphene powder was measured according to Measurement Example 2, whereupon the sedimentation was observed after 1 day.

An electrode for a lithium ion battery containing the graphene powder was prepared according to Measurement Example 3 and the discharge capacity was measured, whereupon it was determined to be 113 mAh/g.

The results are collected in Table 1.

Comparative Example 6

(1) A graphite oxide dispersion was obtained in the same manner as in Example 1

(2) Preparation method of graphene powder To 200 ml of the dispersion of a graphite oxide, 3 g of hydrazine hydrate was added as a reducing agent. The reductive reaction was allowed to undergo at 100° C. as the reductive reaction temperature for 24 hours as the reductive reaction period with a mechanical stirrer. After the resulting graphene dispersion was filtered, the filter cake was redispersed in 100 ml of water and the dispersion was filtered. The process was repeated twice to wash the filter cake. After washing and freeze-drying, a graphene powder was obtained.

(3) Physical properties and performance of graphene

The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $5.99 \times 10^3$ S/m.

The graphene powder after the reduction was measured by X-ray photoelectron spectroscopy according to Measurement Example 2, whereupon the element ratio of oxygen to carbon was 0.06.

The performance in dispersibility of the graphene powder was measured according to Measurement Example 2, whereupon the sedimentation was observed after 6 hours.

An electrode for a lithium ion battery containing the graphene powder was prepared according to Measurement Example 3 and the discharge capacity was measured, whereupon it was determined to be 91 mAh/g.

The results are collected in Table 1.

Comparative Example 7

(1) By heating the graphite oxide prepared in Synthesis Example 1 to 1000° C. Under an Argon Atmosphere, it was Reduced to Obtain a Graphene Powder (2) Physical properties and performance of graphene The electrical conductivity of a graphene powder before and after the reduction was measured according to Measurement Example 1. The electrical conductivity of a graphite oxide before the reduction was determined to be $8.70 \times 10^{-4}$ S/m and the electrical conductivity of the graphene powder after the reduction was determined to be $1.59 \times 10^3$ S/m.

The graphene powder after the reduction was measured by X-ray photoelectron spectroscopy according to Measurement Example 2, whereupon the element ratio of oxygen to carbon was 0.09.

The performance in dispersibility of the graphene powder was measured according to Measurement Example 2, whereupon the sedimentation was observed after 6 hours.

An electrode for a lithium ion battery containing the graphene powder was prepared according to Measurement Example 3 and the discharge capacity was measured, whereupon it was determined to be 85 mAh/g.

The results are collected in Table 1.

Comparative Example 8

The electrical conductivity of Graphene Nanoplatelets (model number M-5, XG Sciences, Inc.) was measured according to Measurement Example 1, whereupon the electrical conductivity was determined to be $1.43 \times 10^4$ S/m.

Graphene Nanoplatelets was measured by X-ray photoelectron spectroscopy according to Measurement Example 2, whereupon the element ratio of oxygen to carbon was 0.04.

The performance in dispersibility of the graphene powder was measured according to Measurement Example 2, whereupon the sedimentation was observed after 2 hours.

An electrode for a lithium ion battery containing the graphene powder was prepared according to Measurement Example 3 and the discharge capacity was measured, whereupon it was determined to be 78 mAh/g.

The results are collected in Table 1.

TABLE 1

| | Dispersion preparation | | | | Reduction process | | | |
|---|---|---|---|---|---|---|---|---|
| | Diluent | Concentration | Dispersing agent | Amount | Reducing agent | Amount | Reaction temperature | Reaction period |
| Example 1 | Ion-exchanged water | 0.50% | Dopamine hydrochloride | 0.5 g | Sodium dithionite | 3 g | 40° C. | 30 minutes |
| Example 2 | Ion-exchanged water | 0.50% | Catechol | 0.5 g | Sodium dithionite | 3 g | 40° C. | 30 minutes |
| Example 3 | Ion-exchanged water | 0.50% | Dopa | 0.5 g | Sodium dithionite | 3 g | 40° C. | 30 minutes |
| Example 4 | Ion-exchanged water | 0.50% | Dopamine hydrochloride | 0.5 g | Potassium dithionite | 3 g | 23° C. | 30 minutes |
| Example 5 | Ion-exchanged water | 0.50% | Catechol | 0.5 g | Potassium dithionite | 3 g | 23° C. | 30 minutes |

TABLE 1-continued

| | | | | | | | | |
|---|---|---|---|---|---|---|---|---|
| Example 6 | Ion-exchanged water | 0.50% | Dopa | 0.5 g | Potassium dithionite | 3 g | 23° C. | 30 minutes |
| Example 7 | Ion-exchanged water | 0.50% | Dopamine hydrochloride | 0.5 g | Sodium dithionite | 3 g | 100° C. | 30 minutes |
| Example 8 | Ion-exchanged water | 0.50% | Catechol | 0.5 g | Sodium dithionite | 3 g | 100° C. | 30 minutes |
| Comparative Example 1 | Ion-exchanged water | 0.50% | — | — | Dopamine hydrochloride | 3 g | 40° C. | 30 minutes |
| Comparative Example 2 | Ion-exchanged water | 0.50% | — | — | Dopamine hydrochloride | 3 g | 100° C. | 24 hours |
| Comparative Example 3 | Ion-exchanged water | 0.50% | — | — | Catechol | 3 g | 40° C. | 30 minutes |
| Comparative Example 4 | Ion-exchanged water | 0.50% | — | — | Catechol | 3 g | 100° C. | 24 hours |
| Comparative Example 5 | Ion-exchanged water | 0.50% | — | — | Sodium dithionite | 3 g | 40° C. | 30 minutes |
| Comparative Example 6 | Ion-exchanged water | 0.50% | — | — | Hydrazine hydrate | 3 g | 100° C. | 24 hours |
| Comparative Example 7 | — | — | — | — | Heat reduction | — | 1000° C. | — |
| Comparative Example 8 | Graphene Nanoplatelets XGNP(M-5, XGSciences, Inc.) | | | | — | | — | — |

| | Results | | | | | | |
|---|---|---|---|---|---|---|---|
| | GO electrical conductivity (S/m) | GS electrical conductivity (S/m) | O/C ratio | N/C ratio | Catechol compounds | Time period required for the sedimentation | Discharge capacity (mAh/g) |
| Example 1 | $8.70 \times 10^{-4}$ | $2.33 \times 10^{3}$ | 0.11 | 0.013 | 18% | 30 days or more | 152 |
| Example 2 | $8.70 \times 10^{-4}$ | $1.52 \times 10^{3}$ | 0.11 | — | 16% | 30 days or more | 150 |
| Example 3 | $8.70 \times 10^{-4}$ | $4.35 \times 10^{3}$ | 0.11 | 0.012 | 17% | 30 days or more | 147 |
| Example 4 | $8.70 \times 10^{-4}$ | $2.21 \times 10^{3}$ | 0.12 | 0.011 | 15% | 30 days or more | 151 |
| Example 5 | $8.70 \times 10^{-4}$ | $1.49 \times 10^{3}$ | 0.12 | — | 14% | 30 days or more | 148 |
| Example 6 | $8.70 \times 10^{-4}$ | $4.13 \times 10^{3}$ | 0.12 | 0.011 | 15% | 30 days or more | 145 |
| Example 7 | $8.70 \times 10^{-4}$ | $1.01 \times 10^{4}$ | 0.11 | 0.014 | 19% | 30 days or more | 142 |
| Example 8 | $8.70 \times 10^{-4}$ | $6.61 \times 10^{3}$ | 0.11 | — | 15% | 30 days or more | 145 |
| Comparative Example 1 | $8.70 \times 10^{-4}$ | — | 0.41 | 0.006 | 6% | — | — |
| Comparative Example 2 | $8.70 \times 10^{-4}$ | $6.81 \times 10^{2}$ | 0.23 | 0.013 | 17% | 30 days or more | 129 |
| Comparative Example 3 | $8.70 \times 10^{-4}$ | — | 0.42 | — | 13% | — | — |
| Comparative Example 4 | $8.70 \times 10^{-4}$ | $5.83 \times 10^{2}$ | 0.24 | — | 14% | 30 days or more | 121 |
| Comparative Example 5 | $8.70 \times 10^{-4}$ | $6.90 \times 10^{3}$ | 0.09 | — | — | 1 day | 113 |
| Comparative Example 6 | $8.70 \times 10^{-4}$ | $5.99 \times 10^{3}$ | 0.06 | — | — | 6 hours | 91 |
| Comparative Example 7 | $8.70 \times 10^{-4}$ | $1.59 \times 10^{3}$ | 0.09 | — | — | 6 hours | 85 |
| Comparative Example 8 | — | $1.43 \times 10^{4}$ | 0.04 | — | — | 2 hours | 78 |

The invention claimed is:

1. A graphene powder comprising graphene and a compound having a catechol group adsorbed on the graphene in a weight ratio of 5% or more and 50% or less relative to the graphene, and an element ratio of oxygen to carbon in the graphene powder measured by X-ray photoelectron spectroscopy is 0.06 or more and 0.20 or less.

2. The graphene powder according to claim 1, wherein the compound is selected from the group consisting of catechol, dopamine hydrochloride, dopa, noradrenalin, 3,4-dihydroxybenzoic acid, 3,4-dihydroxyphenylacetic acid, caffeic acid, 4-methylcatechol, 4-tert-butylpyrocatechol, and combinations thereof.

3. The graphene powder according to claim 2, wherein the compound is selected from the group consisting of dopamine hydrochloride and dopa.

4. The graphene powder according to claim 3, wherein an element ratio of nitrogen to carbon measured by X-ray photoelectron spectroscopy is 0.005 or more and 0.02 or less.

5. A lithium ion battery electrode, comprising the graphene powder according to claim 1, an electrode active material and a binder.

6. A lithium ion battery electrode, comprising the graphene powder according to claim 2, an electrode active material and a binder.

7. A lithium ion battery electrode, comprising the graphene powder according to claim 3, an electrode active material and a binder.

8. A lithium ion battery electrode, comprising the graphene powder according to claim 4, an electrode active material and a binder.

9. The graphene powder of claim 1, wherein the graphene powder has good dispersibility in a solution of 1 part by weight of the graphene powder in 99 parts by weight of N-methylpyrrolidone, wherein the solution is subjected to ultrasonification for 30 minutes, and wherein the good dispersibility means that the solution after the ultrasonification is in a state of being visually homogeneous.

10. A graphene powder comprising graphene and a compound adsorbed on the graphene in a weight ratio of 5% or more and 50% or less relative to the graphene, wherein the compound has a structure in which a portion or all of the 3-position to 6-position of 1,2-benzendiol are modified, and an element ratio of oxygen to carbon in the graphene powder measured by X-ray photoelectron spectroscopy is 0.06 or more and 0.20 or less.

* * * * *